United States Patent
Min et al.

(10) Patent No.: US 12,272,361 B2
(45) Date of Patent: *Apr. 8, 2025

(54) GUIDANCE QUERY FOR CACHE SYSTEM

(71) Applicant: Comcast Cable Communications, LLC, Philadelphia, PA (US)

(72) Inventors: Rui Min, Vienna, VA (US); Hongcheng Wang, Arlington, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 21 days.

This patent is subject to a terminal disclaimer.

(21) Appl. No.: 18/184,783

(22) Filed: Mar. 16, 2023

(65) Prior Publication Data

US 2023/0223027 A1 Jul. 13, 2023

Related U.S. Application Data

(63) Continuation of application No. 16/659,262, filed on Oct. 21, 2019, now Pat. No. 11,609,947.

(51) Int. Cl.
*G10L 15/28* (2013.01)
*G06F 16/632* (2019.01)
(Continued)

(52) U.S. Cl.
CPC .......... *G10L 15/285* (2013.01); *G06F 16/634* (2019.01); *G06F 16/636* (2019.01);
(Continued)

(58) Field of Classification Search
CPC ....... G10L 15/285; G10L 25/54; G10L 15/32; G06F 16/634; G06F 16/636; G06F 16/65; G06F 18/2413
See application file for complete search history.

(56) References Cited

U.S. PATENT DOCUMENTS 6,366,882 B1 4/2002 Bijl et al.
6,665,645 B1 12/2003 Ibaraki et al.
(Continued)

FOREIGN PATENT DOCUMENTS

CN 104866274 A 8/2015

OTHER PUBLICATIONS

US Patent Application filed Aug. 25, 2021, entitled "Media Search Filtering Mechanism For Search Engine", U.S. Appl. No. 17/445,865.
(Continued)

*Primary Examiner* — Linda Wong
(74) *Attorney, Agent, or Firm* — BakerHostetler (57) ABSTRACT

A device may be configured to determine whether an audio file is a first type of audio file that is capable of being processed to recognize the voice query based on a characteristic of the audio file itself or a second type of audio file that may require speech recognition processing in order to recognize the voice query associated with the audio file. In determining whether the audio file is a first type of audio file or a second type of audio file, a query filter associated with the device may be configured to access one or more guidance queries. Using the one or more guidance queries, the device may classify the audio file as a first type of audio file or a second type of audio file based on receiving only a portion of the audio file, thereby improving the speed at which the audio file can be processed.

20 Claims, 6 Drawing Sheets

(51) Int. Cl.
*G06F 16/635* (2019.01)
*G06F 16/65* (2019.01)
*G06F 18/2413* (2023.01)
*G10L 15/32* (2013.01)
*G10L 25/54* (2013.01)

(52) U.S. Cl.
CPC .......... *G06F 16/65* (2019.01); *G06F 18/2413* (2023.01); *G10L 25/54* (2013.01); *G10L 15/32* (2013.01)

(56) References Cited

U.S. PATENT DOCUMENTS

| | | | |
|---|---|---|---|
| 6,785,654 | B2 | 8/2004 | Cyr et al. |
| 8,971,543 | B1 | 3/2015 | List |
| 9,070,367 | B1 | 6/2015 | Hoffmeister et al. |
| 9,536,151 | B1 | 1/2017 | Postelnicu et al. |
| 9,871,606 | B1 | 1/2018 | Carroll et al. |
| 10,067,934 | B1 | 9/2018 | Tran et al. |
| 10,681,032 | B2 * | 6/2020 | Maddox .............. H04L 63/0861 |
| 11,106,729 | B2 | 8/2021 | Min et al. |
| 2003/0061036 | A1 | 3/2003 | Garudadri et al. |
| 2003/0065655 | A1 | 4/2003 | Syeda-Mahmood |
| 2003/0081744 | A1 | 5/2003 | Gurfein et al. |
| 2004/0010409 | A1 | 1/2004 | Ushida et al. |
| 2005/0201254 | A1 | 9/2005 | Looney et al. |
| 2007/0247979 | A1 | 10/2007 | Brillon et al. |
| 2008/0086379 | A1 | 4/2008 | Dion et al. |
| 2008/0109285 | A1 | 5/2008 | Reuther et al. |
| 2009/0138109 | A1 | 5/2009 | Park |
| 2009/0307368 | A1 | 12/2009 | Sriram et al. |
| 2012/0089392 | A1 | 4/2012 | Larco et al. |
| 2013/0070093 | A1 | 3/2013 | Rivera et al. |
| 2014/0074846 | A1 | 3/2014 | Moss et al. |
| 2014/0195557 | A1 * | 7/2014 | Oztaskent .......... H04N 21/4826 707/769 |
| 2014/0277638 | A1 | 9/2014 | Smith |
| 2014/0317523 | A1 | 10/2014 | Wantland et al. |
| 2014/0380379 | A1 | 12/2014 | Klappert et al. |
| 2015/0025663 | A1 | 1/2015 | Cameron et al. |
| 2015/0161990 | A1 | 6/2015 | Sharifi |
| 2015/0169682 | A1 | 6/2015 | Toshev |
| 2015/0331939 | A1 | 11/2015 | Burgmeier et al. |
| 2016/0085800 | A1 | 3/2016 | Pujari |
| 2016/0085846 | A1 | 3/2016 | Smith |
| 2016/0119713 | A1 | 4/2016 | Knox et al. |
| 2017/0013314 | A1 | 1/2017 | Mallinson |
| 2017/0078737 | A1 | 3/2017 | Jagt et al. |
| 2017/0249664 | A1 | 8/2017 | Harik et al. |
| 2018/0061421 | A1 | 3/2018 | Sarikaya |
| 2018/0277132 | A1 | 9/2018 | Levoit |
| 2019/0182072 | A1 | 6/2019 | Roe et al. |
| 2019/0206396 | A1 | 7/2019 | Chen |
| 2020/0111338 | A1 * | 4/2020 | Pham ....................... G07F 7/10 |
| 2020/0234720 | A1 | 7/2020 | Sung et al. |
| 2021/0193167 | A1 | 6/2021 | Jiang |

OTHER PUBLICATIONS

US Patent Application filed Oct. 21, 2019, entitled "Guidance Query for Cache System", U.S. Appl. No. 16/659,262.

* cited by examiner

GUIDANCE QUERY FOR CACHE SYSTEM

CROSS REFERENCE TO RELATED APPLICATIONS

This application is a continuation of U.S. patent application Ser. No. 16/659,262, filed Oct. 21, 2019, now U.S. Pat. No. 11,609,947, issued Mar. 21, 2023, which is hereby incorporated by reference in its entirety.

BACKGROUND

Speech recognition engines may be used to provide speech-based services for television and other areas, for example, by allowing users to control their cable set-top boxes by speaking into their cellular telephones or into the hand-held remote control of the cable set-top box. Speech recognition engines provide a number of advantages over traditional set-top box remote or web interfaces by eliminating the need for typing or other keyboard-based or remote-based entry methods, such as TV or cable remotes. However, the capacity of a speech recognition engine may be limited as the recognition process may be very CPU and memory intensive. Improvements to speech recognition processing may be desirable.

SUMMARY

Methods and systems are described for filtering audio files to improve the efficiency of a speech recognition engine. An audio file corresponding to a voice query may be received at a device such as a voice activated device. The device may be configured to determine whether the audio file is a first type of audio file that is capable of being processed to recognize the voice query based on a characteristic of the audio file itself (i.e., without the need for speech recognition) or a second type of audio file that may require speech recognition processing in order to recognize the voice query associated with the audio file. In determining whether the audio file is a first type of audio file or a second type of audio file, a query filter associated with the device may be configured to access one or more guidance queries. Based on receiving a portion of the audio file, such as the first 100 milliseconds of the audio file, the portion of the audio file may be compared to the one or more guidance queries. If the portion of the audio file corresponds to one or more of the guidance queries, the device may continue to monitor for additional audio associated with the voice query. If the portion of the audio file does not correspond to one or more of the guidance queries, the query filter may determine that the audio file is not capable of being processed at the device and may determine to send the audio file for speech recognition processing. The device may classify the audio file as a first type of audio file or a second type of audio file based on receiving only a portion of the audio file, thereby improving the speed at which the audio file can be processed.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION OF ILLUSTRATIVE EMBODIMENTS

Methods and systems are described for filtering audio files to improve the efficiency of a speech recognition engine and to prevent failures at the speech recognition engine. One method of preventing speech recognition engine failure may be to allocate more hardware and operational resources to accommodate an unexpected spike in requests. However, this solution may be expensive, and as the request spikes happen only occasionally, the extra resources may not be utilized for the majority of speech recognition processing. In addition, even if additional hardware and operational resources are employed during normal system capacity, the extra resources may provide little assistance in the event of an unexpected hardware or network failure. For example, if the network connection to one speech recognition service module in one data center is down, no matter how many additional resources are employed in that specific data center, no request may be able to be processed. Further, traffic volume and service spikes are often difficult to predict. Doubling the amount of resources may not be enough to help in many service spike scenarios, and a ten-fold increase in resources may lead to a large waste of available resources during non-peak times.

A second method for preventing speech recognition engine failure may be to employ a filter that randomly drops queries that are beyond the engine capacity. For example, if a single speech recognition service stack can handle one hundred queries per second, and the actual query volume is five hundred queries per second, four hundred queries may be randomly dropped each second. Thus, only 20% of the users of the speech recognition engine may receive results to their voice queries. While this solution is better than allowing the system to crash and 0% of the users to receive results, it is not an ideal solution. What is needed is a filter that is capable of managing and selectively processing queries based on one or more characteristics of the individual queries.

A query filter may be configured to selectively filter audio files representing voice queries to improve the efficiency of a speech recognition engine. The query filter may be configured to receive an audio file corresponding to a voice query. The query filter may determine whether the audio file is a first type of audio file or a second type of audio file. A first type of audio file may be capable of being processed to recognize the voice query based on a characteristic of the audio file. For example, the audio file may be capable of being processed based on an audio fingerprint that represents certain characteristics of the audio file. An example first type of audio file may comprise the voice query "show me channel ten." This type of voice query may be spoken very similarly by a variety of users. Thus, it may be possible to recognize that audio file as the utterance "show me channel ten" simply from acoustic characteristics of the audio file. A query filter may be configured to process such a first type of audio file (i.e., recognize the voice query) based on the characteristics of the audio file and without performing speech recognition on the audio file.

In contrast, a second type of audio file may require speech recognition processing in order to recognize the voice query associated with the audio file. The query filter may be configured to send, to a server capable of performing speech recognition processing, one or more of the second type of audio files for speech recognition processing. An example second type of audio file may comprise the voice command "show me all of the movies in which Harrison Ford is an actor." These audio files may be harder to recognize, and speech recognition may be necessary to process those audio files in order to recognize what was uttered.

Methods and systems are described herein for improving the speed at which an audio file may be determined to be a first type of audio file or a second type of audio file. The query filter may be configured to access one or more guidance queries that may correspond to portions of one or more other voice queries, such as popular voice queries associated with a content provider or voice queries that are commonly received at the device. An example of a popular voice query received at the device may comprise the voice query "show me channel ten." One or more guidance queries may be generated by a server, such as a content provider, or by a device such as a playback device or a voice activated device, in order to improve the speech recognition process. For example, a first guidance query may be based on the utterance "show," a second guidance query may be based on the utterance "show me," and a third guidance query may be based on the utterance "show me channel."

Upon receiving a voice query, such as "show me kids movies," the query filter may be configured to compare the voice query with the one or more guidance queries in order to determine whether the voice query is a first type of audio file or a second type of audio file. Upon receiving the portion of the voice query "show," the query filter may compare the portion of the voice query to the one or more guidance queries and determine that there is a match. Similarly, upon receiving another portion of the guidance query "show me," the query filter may compare the portion of the voice query to the one or more guidance queries and determine that there is a match. However, upon receiving the portion of the voice query "show me kids . . . " and comparing the portion of the voice query to the one or more guidance queries, the query filter may determine that there is not a guidance query match and therefore that this voice query may need to be sent to a server for speech recognition processing (e.g., the voice query is a second type of voice query). This determination may be made before the entirety of the voice query is received, thus improving the speed at which queries may be selectively filtered, and ultimately improving the speed at which results may be provided to the user.

Comparing a portion of the audio file to the one or more guidance queries may comprise generating an audio fingerprint based on the portion of the audio file and comparing the audio fingerprint based on the portion of the audio file with one or more audio fingerprints based on the one or more guidance queries. For example, based on receiving the first portion of the audio file "show," an audio fingerprint based on the first portion of the audio file may be generated. The audio fingerprint based on the first portion of the audio file may be compared with the audio fingerprints associated with the one or more guidance queries to determine whether the first portion of the audio file corresponds to any of the one or more guidance queries. For example, the audio fingerprint of the first portion of the received audio file "show" may be compared to respective audio fingerprints for the guidance queries "show," "show me," "show me channel," etc. If it is determined that the first portion of the audio file corresponds to at least one of the one or more guidance queries, the user device 102 may continue to monitor for additional portions of the audio file associated with the voice query. In contrast, if it is determined that the first portion of the audio file does not correspond to at least one of the one or more guidance queries, the audio file may be sent to the server 120 for processing.

The determination of whether the audio file is a first type of audio file or a second type of audio file may be based on receiving only a portion of the audio file. In other words, the device does not need to wait until the entirety of the audio file has been received in order to determine whether the audio file is a first type of audio file or a second type of audio file. Based on determining that an audio file is a second type of audio file, the device may determine not to perform steps typically associated with the first types of audio files, such as generating audio fingerprints based on the audio files and comparing the audio fingerprints based on the audio files to one or more stored audio fingerprints, thereby saving considerable time. For example, the process of generating and comparing audio fingerprints at the cache may create a delay of one second before the audio file is sent for processing. By determining that an audio file is a second type of audio file prior to the entirety of the audio file being received at the device, at least a portion of this delay may be eliminated.

Figure 1:
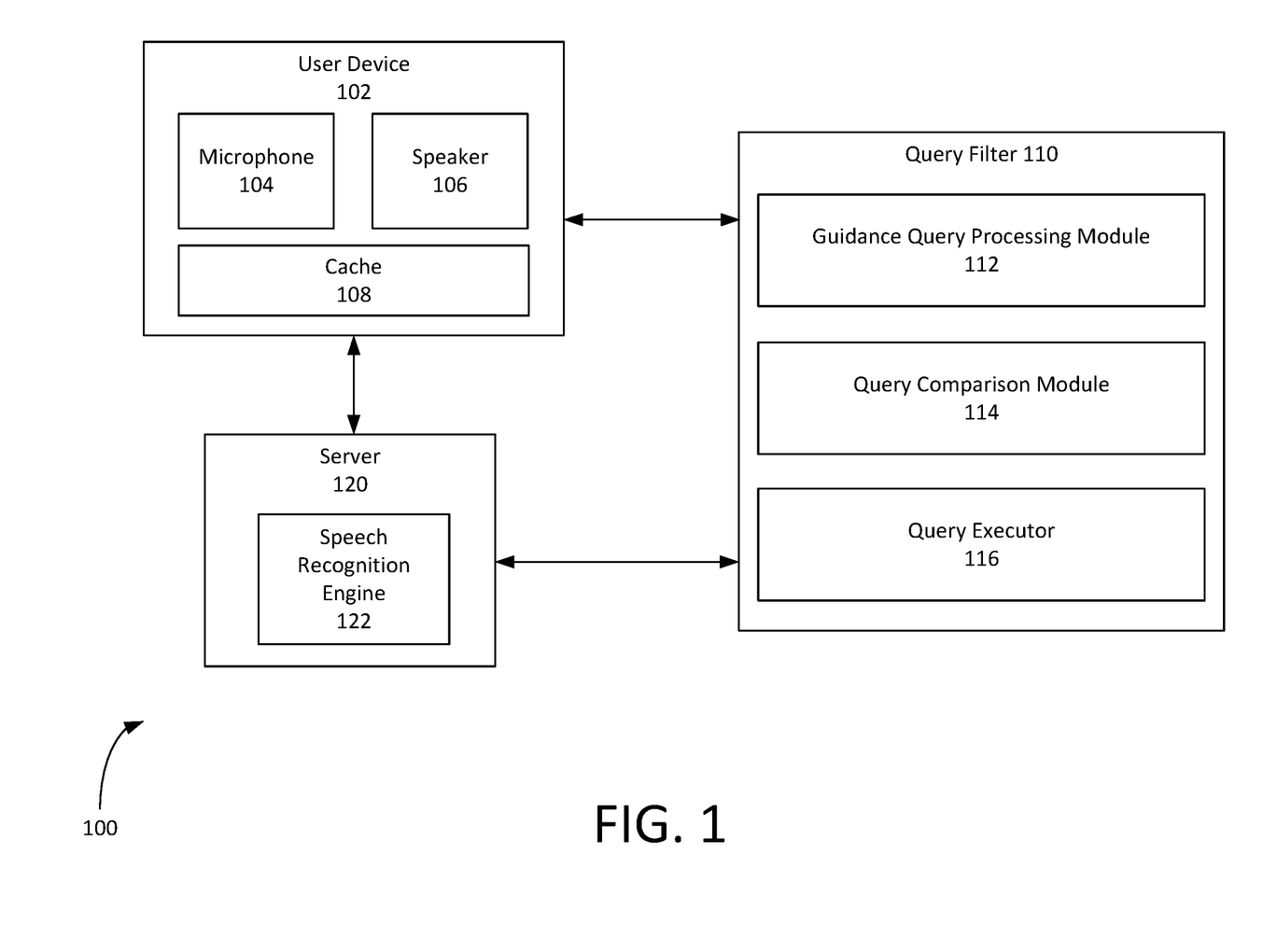
FIG. 1 shows a block diagram of an example system.

FIG. 1 shows a block diagram of an example system 100. The system 100 may comprise a user device 102, a query filter 110, and a server 120. The user device 102 may be a voice activated device, such as a voice activated remote control. The user device 102 may be configured to receive voice queries via a microphone, such as microphone 104. The user device 102 may further comprise a speaker, such as speaker 106. The speaker 106 may be configured to output audio in response to receipt of the voice query. For example, a voice query may be received through the microphone 104 comprising an utterance such as "what is the current temperature." In response to the voice query, the user device 102 through the speaker 106 may output a response such as "the current temperature is seventy-six degrees." At least a portion of the user device 102 (e.g., the cache 108) may be implemented on a remote server. For example, all or a portion of the operations performed by the user device 102 may be implemented by a cloud server.

The user device may comprise a cache, such as the cache 108. The cache 108 may store one or more audio fingerprints corresponding to one or more voice queries, such as popular voice queries received at the user device 102. The cache 108 may be configured to compare an audio fingerprint of a received voice query to one or more of the stored audio fingerprints associated with the one or more "popular" voice queries in order to determine whether there is a cache hit. Based on determining that there is a cache hit, the cache 108 may determine a corresponding command associated with the received voice query and may cause execution of that command. The cache 108 may additionally or alternatively store one or more guidance queries and one or more audio fingerprints associated with the one or more guidance queries. As discussed herein, the one or more guidance queries may correspond to portions of the one or more "popular" voice queries. The cache 108 may be configured to compare an audio fingerprint of a received portion of a voice query with one or more of the stored audio fingerprints associated with the one or more guidance queries in order to determine whether or not there is likely to be a cache hit.

The query filter 110 may be configured to filter audio files based on one or more characteristics of the audio files in order to improve the efficiency of a speech recognition engine, such as speech recognition engine 122. The query filter 110 may comprise a number of sub-filters configured to filter audio files based on one or more characteristics of the audio files in order to improve the efficiency of the process. For example, some characteristics may include one or more of an audio fingerprint, spectrogram, energy signature, and/or and acoustic features of the audio files. Characteristics can relate to an entire video file or one or more portions thereof, and can comprise summary characteristics for an audio file. The query filter 110 may comprise a guidance query processing module 112, a query comparison module 114, and a query executor 116. While shown in FIG. 1 as being separate from the user device 102 and the server 120, it is understood that the query filter 110 and/or individual components of the query filter 110 may be part of the user device 102 and/or the server 120.

The guidance query processing module 112 may be configured to determine or generate one or more guidance queries based on one or more voice queries. The guidance query processing module 112 may be configured to receive or access one or more voice queries. The voice queries may be received or accessed from one of the user device 102 or the server 120. The guidance query processing module 112 may determine the one or more guidance queries, for example, based on one or more utterances of the voice query or based on one or more time intervals of the voice query. In an example voice query "show me channel ten," the guidance query processing module may generate a first guidance query based on the utterance "show," a second guidance query based on the utterance "show me," and a third guidance query based on the utterance "show me channel." Additionally or alternatively, the guidance query processing module 112 may generate one or more guidance queries that are based on one or more time intervals of the voice query, such as a first guidance query that is based on the first 100 milliseconds of the voice query, a second guidance query that is based on the first 200 milliseconds of the voice query, and a third guidance query that is based on the first 300 milliseconds of the guidance query.

The guidance query processing module 112 may be configured to generate one or more audio fingerprints based on the one or more guidance queries. The guidance query processing module 112 may determine an audio fingerprint based on the guidance query using an audio fingerprinting algorithm. The audio fingerprint may be a unique audio characteristic associated with the received guidance queries. For example, the audio fingerprint may comprise a randomly selected portion of the guidance query, such as a sampling of the guidance query captured once every 10 milliseconds.

Determining an audio fingerprint based on the guidance query may comprise the following steps: (1) background noise reduction and audio-sampling; (2) feature extraction based on a spectrogram of the guidance query; (3) hash code generation and (4) hash code comparison based on a distance metric, such as Levenshtein distance metric. In one aspect, the hash code may be generated using a deep learning based approach, such as Semantic Hashing and Restricted Boltzmann Machine, LSTM (Long-Short Time Memory), in order to automatically learn the features and hash codes simultaneously from the spectrum of the audio files. For example, a deep neural network may be used to encode multiple utterances of the same transcription, such that the cache may learn the feature representation layer-by-layer.

The query comparison module 114 may be configured to classify one or more audio files based on one or more characteristics of the audio file, such as an amount or type of processing that may be required to determine a voice query associated with the audio file. For example, a first type of audio file may be an audio file that is capable of being processed to recognize the voice query based on a characteristic of the audio file itself (i.e., without the need for speech recognition). A second type of audio file may require speech recognition processing in order to recognize the voice query associated with the audio file. In one example, the second type of audio file may require processing by an active speech recognition engine, a natural language processor, etc., which may be available at server 120. In contrast, the first type of audio file may only require processing by a local server or may be recognized by a local processor of the user device 102 and/or the query filter 110.

The query comparison module 114 may determine that an audio file is a first type of audio file based, for example, on a set of rules or a classifier. The query comparison module 114, or an associated memory and processor, may collect the audio file and may use machine learning to create a set of rules mapping the audio file to a transcription. The set of rules may be referred to herein as a set of model data. During runtime, the query comparison module 114 may compare the audio file with the filter rules to determine whether the audio file is a first type of audio file or a second type of audio file. The model data may remain stable and may only need to be updated infrequently, for example, monthly or weekly.

In the example that the query comparison module 114 processes the first type of audio file based on the characteristic of the audio file, the query comparison module 114 may be configured to determine an audio fingerprint based on the audio file and to compare the audio fingerprint based on the audio file to a number of stored audio fingerprints, each of the stored audio fingerprints being associated with a stored audio transcription.

The query comparison module 114 may determine whether the audio fingerprint based on the audio file corresponds to one of the plurality of audio fingerprints stored in the query filter 110. The stored audio transcriptions associated with the stored audio fingerprints may have been previously received from a server capable of performing speech recognition, such as the server 120, after having performed speech recognition on audio files from which the stored audio fingerprints were generated. The plurality of audio transcriptions stored in the query filter 110 may correspond to popular voice queries received at the user device 102 associated with the query filter 110. In the example that the audio file corresponds to the voice query "show me channel ten," determining whether the audio fingerprint corresponds to one of a plurality of audio fingerprints stored in the cache may comprise comparing the audio fingerprint generated from the received audio file with each of the audio fingerprints and associated transcriptions stored in the cache and determining that a particular one of the stored fingerprints matches the fingerprint of the received audio file. In that case, the audio transcription associated with the matching stored fingerprint in the cache may be selected as the audio transcription for the received audio file—without having to perform speech recognition on the received audio file.

The plurality of audio fingerprints and associated transcriptions stored in the query filter 110 may correspond to popular voice queries received at a user device, such as user device 102. For example, the query filter 110 may store the audio fingerprints and associated transcriptions associated with the top fifty most recent popular voice queries received at the user device 102. These top fifty most recent popular voice queries may cover about 25% of the total number of voice queries received at the user device 102.

Based on determining that the audio fingerprint corresponds to a given one of the stored audio fingerprints, the query comparison module 114 may be configured to process the audio file to "recognize" what the user uttered without performing speech recognition. Processing the audio file may comprise selecting the stored audio transcription associated with the matching audio fingerprint in the cache 120 and returning that stored audio transcription to the user device as a response to the voice query.

Based on determining that the audio fingerprint does not correspond to a stored audio fingerprint, the audio file may be sent to a speech recognition engine for processing using speech recognition methods. For example, the audio file may be sent from the query comparison module 114 to the server 120 in response to determining that the audio fingerprint does not correspond to a stored audio fingerprint. In response to sending the audio file to the server 120, an audio transcription determined from speech recognition performed on the audio file may be received from server 120. The audio transcription received from the server 120 may be stored in the query filter 110. The received audio transcription may be used by the query comparison module 114 in responding to the voice query received at the user device 102. In addition, the audio transcription may be stored in the query filter 110 and may be used, for example, in "training" the data stored in the query filter 110. Thus, the audio transcription and an audio fingerprint generated from that same audio file may be added to the query filter 110 and, next time an audio file is received at the query filter 110 for processing, an audio fingerprint based on the audio file may be compared with the stored audio fingerprint and associated transcription to determine if there is a match.

Determining whether an audio file is a first type of audio file or a second type of audio file may comprise comparing the audio file or a portion of the audio file to the one or more guidance queries. The query comparison module 114 may be configured to compare a portion of an audio file to the one or more guidance queries to determine whether the audio file is a first type of audio file or a second type of audio file. An example audio file may correspond to the voice query "show me channel ten." The query filter 110 may have stored thereon a plurality of guidance queries corresponding to the utterances "show," "show me," "show me channel" and "show me channel ten." The query comparison module 114 may receive a first portion of an audio file corresponding to an utterance "show." The query comparison module 114 may compare the first portion of the audio file with the one or more guidance queries and determine that the first portion of the audio file corresponds to at least one of the one or more guidance queries. Based on determining that the first portion of the audio file corresponds to at least one of the one or more guidance queries, the query comparison module 114 may determine that there may be a cache hit for the audio file and may instruct the device to continue to monitor for additional audio associated with the voice query.

The query comparison module 114 may receive a second portion of an audio file corresponding to an utterance "me." The query comparison module 114 may compare the first portion of the audio file and the second portion of the audio file (i.e., "show me") with the one or more guidance queries and determine that the first portion of the audio file and the second portion of the audio file correspond to at least one of the one or more guidance queries. Based on determining that the first portion of the audio file and the second portion of the audio file correspond to at least one of the one or more guidance queries, the query comparison module 114 may determine that there may be a cache hit for the audio file and may instruct the device to continue to monitor for additional audio associated with the voice query.

The query comparison module 114 may receive a third portion of an audio file corresponding to an utterance "channel." The query comparison module 114 may compare the first portion of the audio file, the second portion of the audio file, and the third portion of the audio file (i.e., "show me channel") with the one or more guidance queries and determine that the first portion of the audio file, the second portion of the audio file, and the third portion of the audio file correspond to at least one of the one or more guidance queries. Based on determining that the first portion of the audio file, the second portion of the audio file, and the third portion of the audio file correspond to at least one of the one or more guidance queries, the query comparison module 114 may determine that there may be a cache hit for the audio file and may instruct the device to continue to monitor for additional audio associated with the voice query.

The query comparison module 114 may additionally or alternatively receive a third portion of an audio file corresponding to the utterance "kids" (e.g., based on a voice query "show me kids movies"). The query comparison module 114 may compare the first portion of the audio file, the second portion of the audio file, and the third portion of the audio file (i.e., show me kids . . . ") with the one or more guidance queries and determine that the first portion of the audio file, the second portion of the audio file, and the third portion of the audio file do not correspond to at least one of the one or more guidance queries. Based on this determination, the query comparison module 114 may determine that there is not a cache hit for the audio file and may determine to send the first portion of the audio file, the second portion of the audio file, and the third portion of the audio file for processing. The query comparison module 114 may additionally or alternatively instruct the user device 102 to continue to monitor for additional audio associated with the audio file. However, the additional audio associated with the audio file may be sent to the server 120 for speech recognition processing by at least one of the query filter 110 or the user device 102.

Comparing a portion of the audio file to the one or more guidance queries may comprise generating an audio fingerprint based on the portion of the audio file and comparing the audio fingerprint based on the portion of the audio file with the one or more audio fingerprints based on the one or more guidance queries. For example, based on receiving the first portion of the audio file "show," the query comparison module 114 may be configured to generate an audio fingerprint based on the first portion of the audio file. The audio fingerprint based on the first portion of the audio file may be compared with the audio fingerprints associated with the one or more guidance queries to determine whether the first portion of the audio file corresponds to any of the one or more guidance queries. For example, the audio fingerprint of the first portion of the received audio file "show" may be compared to respective audio fingerprints for the guidance queries "show," "show me," "show me channel," etc. If it is determined that the first portion of the audio file corresponds to at least one of the one or more guidance queries, the user device 102 may continue to monitor for additional portions of the audio file associated with the voice query. For example, the query comparison module 114 may determine that the audio fingerprint for the first portion of the received audio file "show" matches the audio fingerprint for the guidance query "show," and based on that match, may determine that a cache hit is possible and continue to monitor for additional portions of the received audio file as the user continues to utter the voice query. If it is determined that the first portion of the audio file does not correspond to at least one of the one or more guidance queries, the query comparison module 114 may determine to send the audio file to the server 120 for processing.

As described, the query comparison module 114, based on determining that the at least a portion of the audio file corresponds to a given one of the guidance queries, may determine that there may be a cache hit for the audio file and may instruct the user device 102 to continue to monitor for audio associated with the voice query. Based on determining that a remainder of the audio file has been received at the device 102 (e.g., a complete voice query or audio command), the query comparison module 114 may compare the audio file to the plurality of stored audio fingerprints corresponding to the one or more guidance queries to determine whether there is a match. If a match is detected, the query comparison module 114 may determine that the audio file is a first type of audio file, and the audio file may be processed at the device 102 and/or the query filter 110. Additionally or alternatively, based on determining that a match is not detected between at least a portion of the audio file, the one or more guidance queries and/or the one or more stored audio transcriptions, the query comparison module 114 may determine that the audio file is a second type of audio file that should be send to the server 120 for speech recognition processing.

The query executor 116 may be configured to process the audio file corresponding to the voice query. The query executor 116 may receive an indication from the query comparison module 114 of whether a particular audio file matches a corresponding audio fingerprint of a known or learned query. Based on receiving the indication that the audio file matches a corresponding audio fingerprint, the query executor 116 may execute a command associated with the audio file. For example, based on receiving an indication that a received audio file corresponds to an audio fingerprint based on a voice query "show me channel ten," the query executor 116 may instruct another device (e.g., a set top box) to tune to channel ten. Based on receiving an indication that a received audio file does not correspond to an audio fingerprint based on a voice query, the query executor 116 may send the audio file to the server 120 for processing. In this example, the query executor 116 may receive a transcription of the audio file from the server 120 and may execute a command based on the received transcription.

The server 120 may be any server capable of performing speech recognition processing and may comprise a speech recognition engine 122 and a bandwidth determination module 114. The speech recognition engine 122 may be configured to perform speech recognition processing, such as automated speech recognition processing. The speech recognition engine 122 may comprise, for example, one or more of a speech capture module, a digital signal processor (DSP) module, a preprocessed signal storage module, a reference speech pattern module and a pattern matching algorithm module. Speech recognition may be done in a variety of ways and at different levels of complexity, for example, using one or more of pattern matching, pattern and feature analysis, and language modeling and statistical analysis, as discussed further herein. However, it is understood that any type of speech recognition may be used, and the examples provided herein are not intended to limit the capabilities of the server 120.

Pattern matching may comprise recognizing each word in its entirety and employing a pattern matching algorithm to match a limited number of words with stored reference speech patterns. An example implementation of pattern patching is a computerized switchboard. For example, a person who calls a bank may encounter an automated message instructing the user to say "one" for account balance, "two" for credit card information, or "three" to speak to a customer representative. In this example, the stored reference speech patterns may comprise multiple reference speech patterns for the words "one" "two" and "three." Thus, the computer analyzing the speech may not have to do any sentence parsing or any understanding of syntax. Instead, the entire chunk of sound may be compared to similar stored patterns in the memory.

Pattern and feature analysis may comprise breaking each word into bits and recognizing the bits from key features, for example, the vowels contained in the word. For example, pattern and feature analysis may comprise digitizing the sound using an analog to digital converter (A/D converter). The digital data may then be converted into a spectrogram, which is a graph showing how the component frequencies of the sound change in intensity over time. This may be done, for example, using a Fast Fourier Transform (FFT). The spectrogram may be broken into a plurality overlapping acoustic frames. These frames may be digitally processed in various ways and analyzed to find the components of speech they contain. The components may then be compared to a phonetic dictionary, such as one found in stored patterns in the memory.

Language modeling and statistical analysis is a more sophisticated speech recognition method in which knowledge of grammar and the probability of certain words or sounds following one from another is used to speed up recognition and improve accuracy. For example, complex voice recognition systems may comprise a vocabulary of over 50,000 words. Language models may be used to give context to words, for example, by analyzing the words proceeding and following the word in order to interpret different meanings the word may have. Language modeling and statistical analysis may be used to train a speech recognition system in order to improve recognition of words based on different pronunciations.

Figure 2:
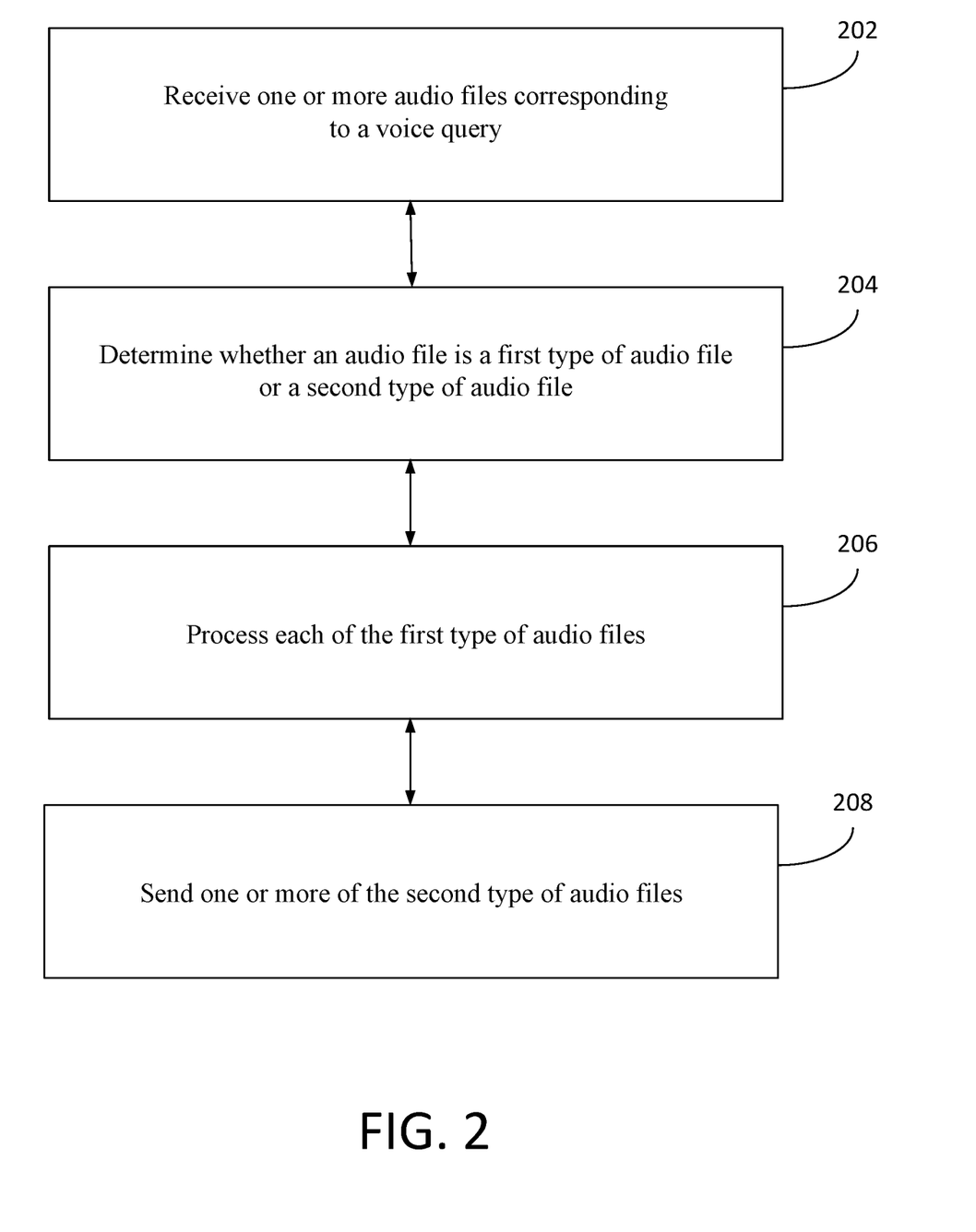
FIG. 2 shows a flow chart of an example method.

FIG. 2 illustrates an example method 200 for filtering audio files. At step 202, one or more audio files may be received. Each of the one or more audio files may correspond to a voice query. The audio files may be received, for example, at the query filter 110 from the user device 102. The user device 102 may be configured to send the audio file to the query filter 110 in response to receipt of the corresponding voice query at the user device 102. In one example, the voice query may comprise a voice command, such as the voice command "show me channel ten."

At step 204, it may be determined, for each of the plurality of audio files, whether the audio file is a first type of audio file or a second type of audio file. A first type of audio file may be capable of being processed to recognize the voice query based on a characteristic of the audio file and without performing speech recognition. For example, as discussed herein, the query filter 110 may be configured to generate an audio fingerprint representing one or more characteristics of the first type of audio file and to compare those characteristics with characteristics of a plurality of stored audio fingerprints, each of the stored audio fingerprints being associated with a stored audio transcription. Thus, determining that the audio file is a first type of audio file may comprise determining that the audio file maps to a stored transcription. In contrast, a second type of audio file may require speech recognition processing in order to recognize the voice query associated with the audio file. This determination may be made, for example, based on the complexity of the received audio file or the lack of an audio transcription stored in the query filter 110. For example, the second type of audio file may correspond to one that represents a more complex voice query, such as "show me all of the movies in which Harrison Ford is an actor."

At step 206, each of the first type of audio files may be processed. Processing a first type of audio file may comprise generating a response to the voice query associated with the audio file based on the stored audio transcription. As discussed herein, an example voice query may comprise the voice command "show me channel ten" spoken by a user of the user device 102. In this example, processing the first type of audio file may comprise determining an audio fingerprint based on the voice command "show me channel ten," comparing the audio fingerprint to a plurality of stored audio fingerprints and associated audio transcriptions, and determining that a particular one of the stored audio fingerprints and its associated audio transcription also correspond to the voice query "show me channel ten." Processing the audio file may comprise generating and sending a response to the user device 102, based on the audio transcription, to communicate with the nearest set-top box to change the channel to channel ten.

At step 208, one or more of the second type of audio files may be sent for processing. The query filter may be configured to send the one or more second type of audio files to a server, such as the server 120. The server 120 may be configured to perform speech recognition processing on the audio files, for example using the speech recognition engine 122, in order to recognize the voice query associated with the audio file.

Determining whether the audio file is a first type of audio file or a second type of audio file may comprise comparing a portion of the audio file to one or more guidance queries. Based on determining that a portion of the audio file corresponds to one or more of the guidance queries, it may be determined that the audio file may be a first type of audio file and the device may continue to monitor for audio associated with the audio file. Additionally or alternatively, based on determining that the portion of the audio file does not correspond to one or more of the guidance queries, it may be determined that the audio file is a second type of audio file. While the device may continue to monitor for audio associated with the audio file, the audio file may not be processed at the device 102 and/or the query filter 110, and instead the audio file may be sent to the server 120 for processing.

The determination of whether the audio file is a first type of audio file or a second type of audio file may be based on receiving only a portion of the audio file. In other words, the device does not need to wait until the entirety of the audio file has been received in order to determine whether the audio file is a first type of audio file or a second type of audio file. Based on determining that an audio file is a second type of audio file, the device may determine not to perform steps typically associated with the first types of audio files, such as generating audio fingerprints based on the audio files and comparing the audio fingerprints based on the audio files to one or more stored audio fingerprints, thereby saving considerable time. For example, the process of generating and comparing audio fingerprints at the cache may create a delay of one second before the audio file is sent for processing. By determining that an audio file is a second type of audio file prior to the entirety of the audio file being received at the device, at least a portion of this delay may be eliminated.

Figure 3:
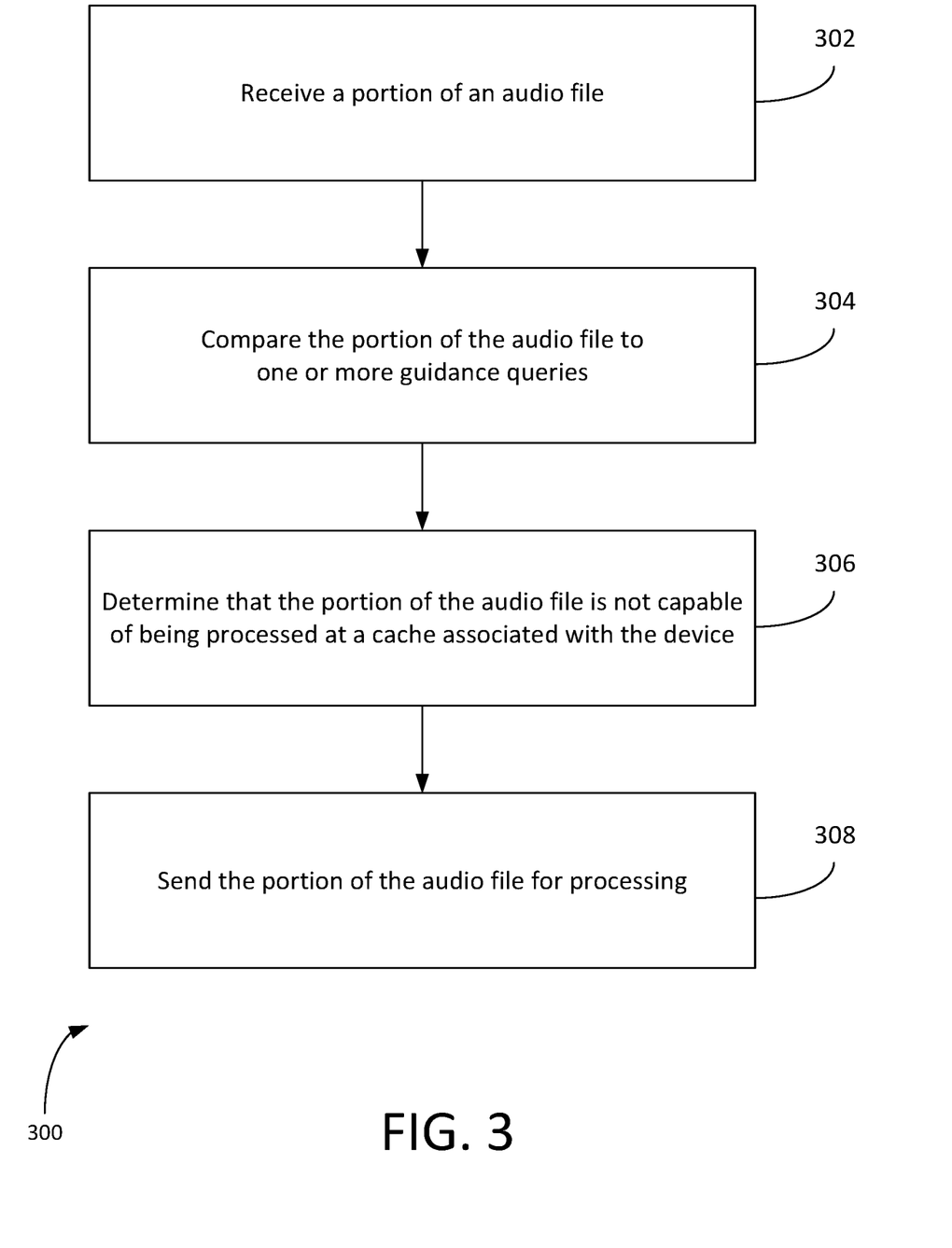
FIG. 3 shows a flow chart of an example method.

FIG. 3 shows a flow chart of an example method 300. At step 302, a portion of an audio file may be received. The portion of the audio file may be received at the query filter 110 associated with the user device 102. The portion of the audio file may correspond to a portion of a voice query. An example voice query may comprise the phrase "show me channel ten." The portion of the audio file may correspond to a particular time interval of the voice query, such as the first 100 milliseconds of the voice query. The portion of the audio file may correspond to one or more utterances of the voice query. For example, the phrase "show me channel ten" may comprise four separate utterances (e.g., "show," "me," "channel," and "ten") and the portion of the audio file may correspond one or more of the utterances (e.g., "show" or "show me").

At step 304, the portion of the audio file may be compared to one or more guidance queries. The one or more guidance queries may correspond to portions of one or more other voice queries. The one or more other voice queries may be stored in a cache of the device. The one or more stored voice queries may correspond to popular voice queries received at the device, such as the top fifty most recent popular voice queries received at the device. Each of the one or more guidance queries may be based on at least a portion of one or more of the stored voice queries. In an example that the utterance "show me channel ten" is a popular voice query, the query filter 110 may generate a plurality of guidance queries based on the utterance. A first guidance query may be based on the utterance "show," a second guidance query may be based on the utterance "show me," and a third guidance query may be based on the utterance "show me channel." The guidance queries may be based on a particular time interval of the stored voice query. For example, a first guidance query may comprise the first 100 milliseconds of the stored voice query, a second guidance query may comprise the first 200 milliseconds of the stored voice query, and a third guidance query may comprise the first 300 milliseconds of the stored voice query.

At step 306, it may be determined that the portion of the audio file is not capable of being processed at the cache associated with the device. The determination may be based on the comparing of the portion of the audio file to the one or more guidance queries. For example, the audio file may correspond to the voice query "show me kids movies." The voice query "show me kids movies" may not be stored in the device (e.g., because it is not a popular query) and therefore there may not be a corresponding guidance query for that voice query. While the query filter may locate a match for audio files corresponding to the utterances "show" and "show me," the query filter, upon detecting the audio file corresponding to the utterance "show me kids" may determine that there is not a corresponding guidance query for this audio file.

Determining that the portion of the audio file is not capable of being processed at the cache associated with the device may comprise determining, prior to receiving at least one other portion of the audio file, that the portion of the audio file is not capable of being processed at the cache associated with the device. For example, the query filter may determine that there is no matching guidance query for the utterance "show me kids . . . " Thus, the device may determine prior to receiving the entire audio file (i.e., "show me kids movies") that the portion of the audio file is not capable of being processed at the cache associated with the device.

The one or more guidance queries may comprise one or more audio fingerprints that are based on the portions of the one or more stored voice queries. Determining that the portion of the audio file is not capable of being processed at the cache associated with the device may comprise generating or receiving an audio fingerprint based on the portion of the audio file and comparing the audio fingerprint based on the portion of the audio file to the one or more audio fingerprints that are based on portions of the one or more stored voice queries. Determining that the portion of the audio file is not capable of being processed at the cache associated with the device may comprise determining that the audio fingerprint based on the portion of the audio file does not correspond to an audio fingerprint of the one or more audio fingerprints that are based on portions of the one or more stored voice queries.

At step 308, the portion of the audio file may be sent for processing. The portion of the audio file may be sent to a server, such as the server 120 comprising the speech recognition engine 122, for processing. The server may be configured to process the audio file (e.g., generate an audio transcription of the audio file) and to send the processed audio file back to the device. The device, upon receiving the processed audio file, may be configured to cause execution of a command associated with the audio file (e.g., sending a command to a nearby television to tune to channel ten). Sending the portion of the audio file for processing may comprise sending, after receiving the at least one other portion of the audio file, the portion of the audio file for processing. For example, while it may be determined upon receiving the audio file corresponding to the voice query "show me kids" that there is no corresponding guidance query, and thus the audio file may need to be sent to the server for processing, the audio file may not be sent to the server for processing until the remainder of the audio file has been received (i.e., "show me kids movies").

Figure 4:
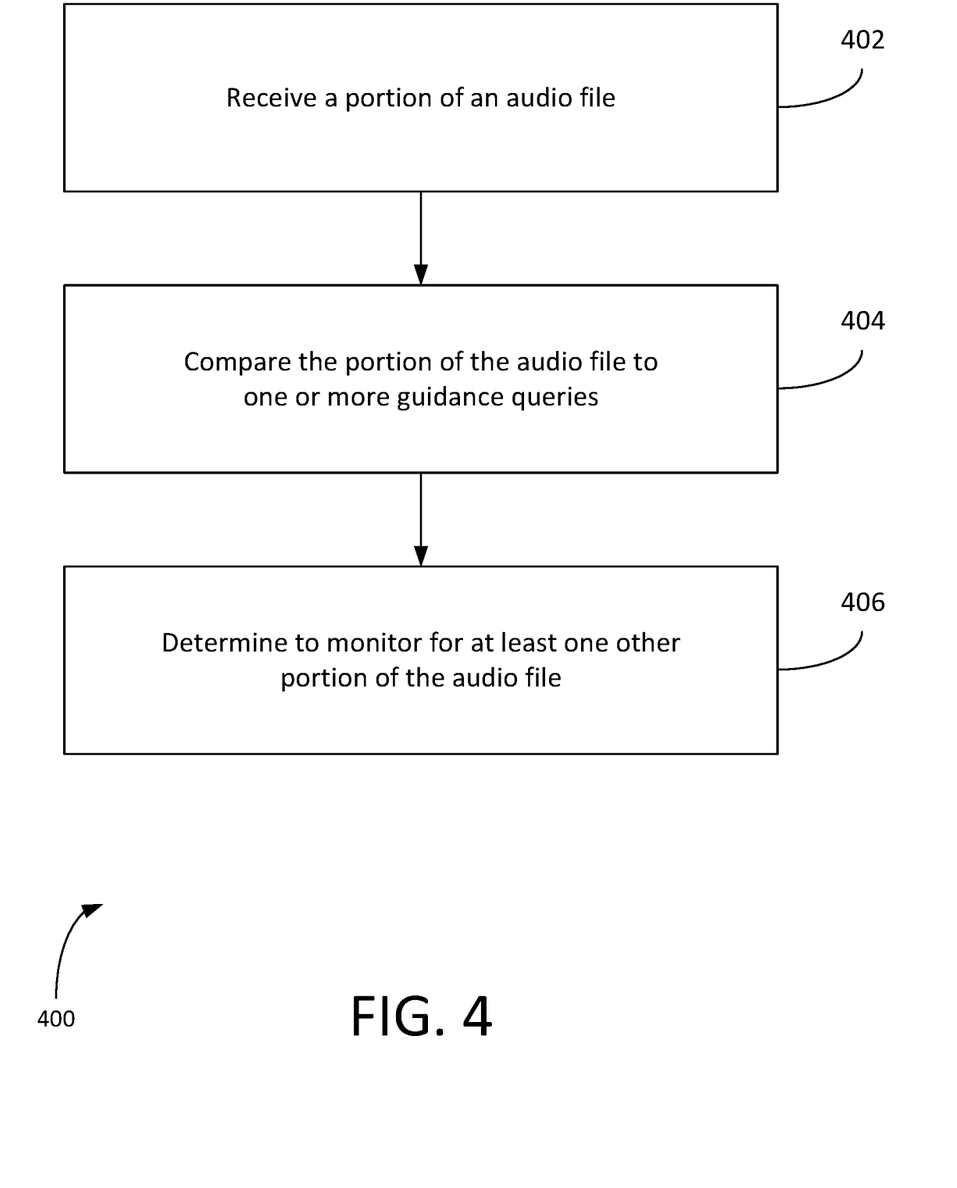
FIG. 4 shows a flow chart of an example method.

FIG. 4 shows a flow chart of an example method 400. At step 402, a portion of an audio file may be received. The portion of the audio file may be received at the query filter 110 associated with the user device 102. The portion of the audio file may correspond to a portion of a voice query. An example voice query may comprise the phrase "show me channel ten." The portion of the audio file may correspond to a particular time interval of the voice query, such as the first 100 milliseconds of the voice query. The portion of the audio file may correspond to one or more utterances of the voice query. For example, the phrase "show me channel ten" may comprise four separate utterances (e.g., "show," "me," "channel," and "ten") and the portion of the audio file may correspond one or more of the utterances (e.g., "show" or "show me").

At step 404, the portion of the audio file may be compared to one or more guidance queries. The one or more guidance queries may correspond to portions of one or more other voice queries. The one or more other voice queries may be stored in a cache of the device. The one or more stored voice queries may correspond to popular voice queries received at the device, such as the top fifty most recent popular voice queries received at the device. Each of the one or more guidance queries may be based on at least a portion of one or more of the stored voice queries. In an example that the utterance "show me channel ten" is a popular voice query, the query filter 110 may generate a plurality of guidance queries based on the utterance. A first guidance query may be based on the utterance "show," a second guidance query may be based on the utterance "show me," and a third guidance query may be based on the utterance "show me channel." The guidance queries may be based on a particular time interval of the stored voice query. For example, a first guidance query may comprise the first 100 milliseconds of the stored voice query, a second guidance query may comprise the first 200 milliseconds of the stored voice query, and a third guidance query may comprise the first 300 milliseconds of the stored voice query.

At step 406, it may be determined that the device should monitor for at least one other portion of the audio file. The determination to monitor for at least one other portion of the audio file may be based on the comparing of the portion of the audio file to the one or more guidance queries. Determining to monitor for the at least one other portion of the audio file may comprise determining that the portion of the audio file corresponds to at least one of the one or more guidance queries. In the example that the query filter has stored thereon guidance queries corresponding to the utterances "show," "show me," "show me channel," and "show me channel ten," the query filter, based on determining that the audio file corresponds to at least one of those utterances, may instruct the device to continue to monitor for additional audio associated with the audio file. For example, upon receiving a first audio file corresponding to the utterance "show" and a second audio file corresponding to the utterance "me," the query filter may determine that the first audio file and the second audio file correspond to the guidance query "show me" and may instruct the device to continue to monitor for additional audio associated with the audio file.

The one or more guidance queries may comprise one or more audio fingerprints that are based on portions of the one or more stored voice queries. Determining to monitor for at least one other portion of the audio file may comprises generating an audio fingerprint based on the portion of the audio file and comparing the audio fingerprint based on the portion of the audio file to the one or more audio fingerprints that are based on the portions of the one or more stored voice queries. Determining to monitor for at least one other portion of the audio file comprises determining that the audio fingerprint based on the portion of the audio file corresponds to at least one audio fingerprint of the one or more audio fingerprints that are based on the portions of the one or more stored voice queries.

The device may receive the at least one other portion of the audio file. The at least one other portion of the audio file may correspond to at least one other portion of the voice query. Using the example above, the device may receive one or more audio files corresponding to the voice query "channel ten." The voice query may be received as a single audio file or as multiple audio files (e.g., "channel" and "ten"). The query filter may be configured to compare the one or more audio files to the one or more stored guidance queries. The device may determine that the portion of the audio file and the at least one other portion of the audio file correspond to a stored voice query. For example, the device may determine that the portion of the audio file "show me" and the at least one other portion of the audio file "channel ten" correspond to a stored voice query "show me channel ten." Based on the determining that the portion of the audio file and the at least one other portion of the audio file correspond to a stored voice query, the portion of the audio file and the at least one other portion of the audio file may be processed in the cache.

Processing the audio file (e.g., the portion of the audio file and the at least one other portion of the audio file) in the cache may comprise comparing the audio file to the one or more stored audio fingerprints associated with one or more other audio files to determine whether there is a cache hit. For example, processing the audio file may comprise determining an audio fingerprint based on the voice command "show me channel ten," comparing the audio fingerprint to a plurality of stored audio fingerprints and associated audio transcriptions, and determining that a particular one of the stored audio fingerprints and its associated audio transcription also correspond to the voice query "show me channel ten." Processing the audio file may comprise generating and sending a response to the user device 102, based on the audio transcription, to communicate with the nearest set-top box to change the channel to channel ten.

The device may determine that the portion of the audio file and the at least one other portion of the audio file do not correspond to a stored voice query. In this case, the device may send the portion of the audio file and the at least one other portion of the audio file to a server for processing, such as speech recognition processing.

Figure 5:
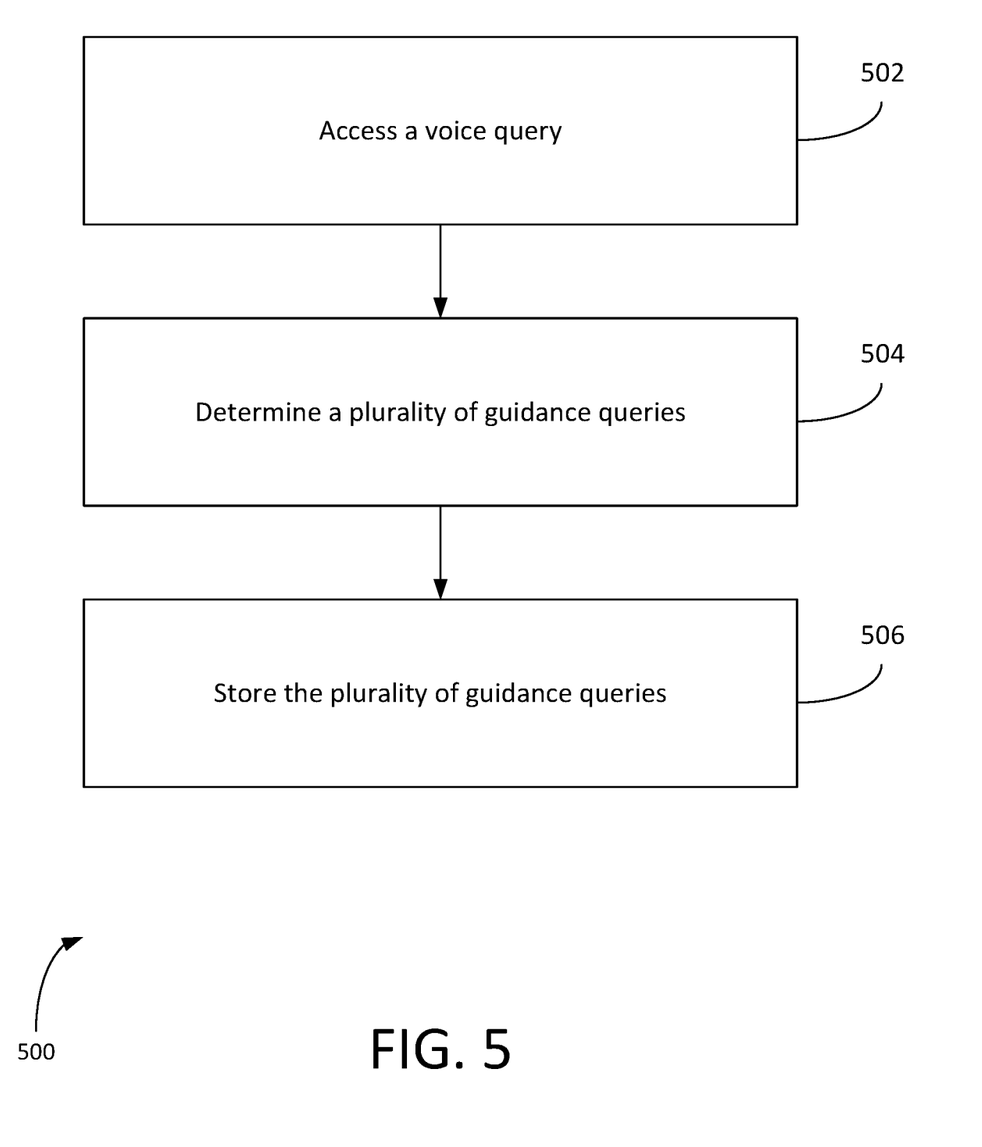
FIG. 5 shows a flow chart of an example method.

FIG. 5 shows a flow chart of an example method 500. At step 502, a voice query may be accessed. The voice query may be accessed by a query filter 110 associated with a device 102. Accessing the voice query may comprise receiving the voice query and/or storing the voice query in a cache of the device. The voice query may comprise one or more utterances, such as the phrase "show me channel ten." The voice query may correspond to one or a plurality of popular voice queries received at the device, such as the top fifty most recent popular voice queries received at the device.

At step 504, a plurality of guidance queries may be determined. The plurality of guidance queries may be determined based on the voice query. Each of the plurality of guidance queries may correspond to one or more portions of the voice query. The voice query may comprise a plurality of utterances and a portion of the voice query may comprise a subset of the plurality of utterances. The plurality of guidance queries may comprise at least a first guidance query that corresponds to a portion of the voice query and a second guidance query that corresponds to the portion of the voice query and at least one other portion of the voice query. In the example that the voice query comprises the phrase "show me channel ten," the query filter may determine or generate a first guidance query based on the utterance "show," a second guidance query based on the utterance "show me," and a third guidance query based on the utterance "show me channel."

The plurality of guidance queries may be based on a particular time interval of the stored voice query. The plurality of guidance queries may comprise at least a first guidance query that corresponds to a first time interval of the voice query and a second guidance query that corresponds to the first time interval of the voice query and second time interval of the voice query For example, a first guidance query may comprise the first 100 milliseconds of the stored voice query, a second guidance query may comprise the first 200 milliseconds of the stored voice query, and a third guidance query may comprise the first 300 milliseconds of the stored voice query.

At step 506, the plurality of guidance queries may be stored. The plurality of guidance queries may be stored in a cache of the device. A plurality of audio fingerprints may be generated based on the plurality of guidance queries. Storing the plurality of guidance queries may additionally or alternatively comprise storing the plurality of audio fingerprints associated with the plurality of guidance queries.

FIGS. 2-5 illustrate example methods where the system 100 may be operated in a serial mode. In other words, the query filter 110 may first attempt to determine whether there is a cache hit for a particular audio file, and may send the audio file to the speech recognition engine 122 based on determining that a cache hit does not exist. The methods and systems disclosed herein improve the speed at which it may be determined whether a cache hit exists for the particular audio file. However, the methods and systems disclosed herein are not limited to the serial mode operation of the system 100.

In parallel mode, the user device 102 may simultaneously (or substantially simultaneously) send the audio file to both the query filter 110 and the server 120 for processing. The user device 102 may utilize whichever result is first received from the query filter 110 or the server 120. If the query filter 110 determines that there is a cache hit and processes the audio file, then the result generated by the query filter 110 may be utilized by the device 102 in responding to the voice query. However, if it is determined that there is not a cache hit, or if the server 120 processes the audio file prior to the query filter 110, then the device 102 may utilize the result from the server 120.

Parallel mode may increase the overall speed at which an audio file may be processed. However, this may come at the cost of expending more resources since the audio file may be sent to the server 120 each time an audio file is received. In some examples, the device 102 may send the audio file to the server 120 only after a particular delay has been identified. For example, if 300 milliseconds have passed without receiving a cache hit, the device 102 may send the audio file to the server. Additionally or alternatively, the query filter 110 may be configured with one or more "hints" in order to increase the accuracy of the query filter 110. The system may be run in parallel mode, but the query filter 110 may be started up first. If the query filter 110 determines based on the hints that there is not likely to be a cache hit, then the audio file may be sent to the server 120.

Figure 6:
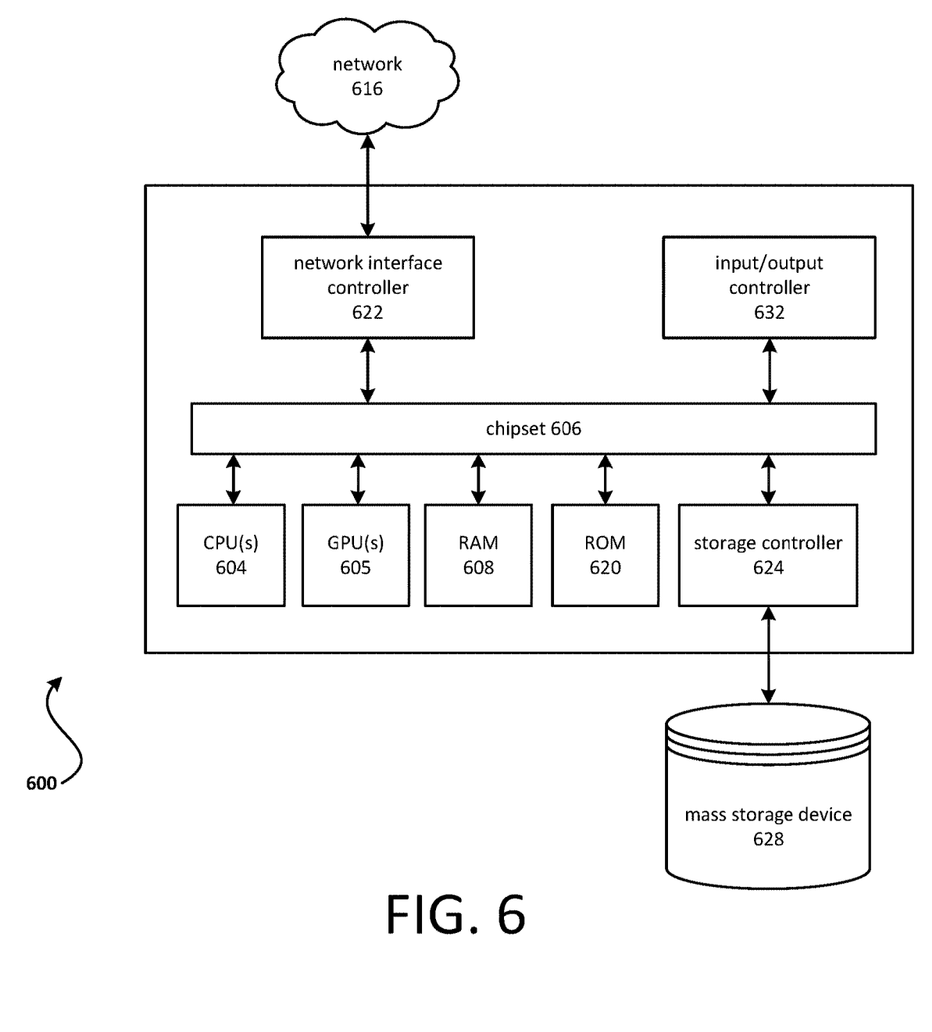
FIG. 6 shows a block diagram of an example computing device.

FIG. 6 depicts a computing device that may be used in various aspects, such as the servers, modules, and/or devices depicted in FIG. 1. With regard to the example architecture of FIG. 1, the user device 102, server 120, and/or the audio device 140 may each be implemented in an instance of a computing device 600 of FIG. 6. The computer architecture shown in FIG. 6 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 2-5.

The computing device 600 may include a baseboard, or "motherboard," which is a printed circuit board to which a multitude of components or devices may be connected by way of a system bus or other electrical communication paths. One or more central processing units (CPUs) 604 may operate in conjunction with a chipset 606. The CPU(s) 604 may be standard programmable processors that perform arithmetic and logical operations necessary for the operation of the computing device 600.

The CPU(s) 604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 604 may be augmented with or replaced by other processing units, such as GPU(s) 605. The GPU(s) 605 may comprise processing units specialized for but not necessarily limited to highly parallel computations, such as graphics and other visualization-related processing.

A chipset 606 may provide an interface between the CPU(s) 604 and the remainder of the components and devices on the baseboard. The chipset 606 may provide an interface to a random access memory (RAM) 608 used as the main memory in the computing device 600. The chipset 606 may provide an interface to a computer-readable storage medium, such as a read-only memory (ROM) 620 or non-volatile RAM (NVRAM) (not shown), for storing basic routines that may help to start up the computing device 600 and to transfer information between the various components and devices. ROM 620 or NVRAM may also store other software components necessary for the operation of the computing device 600 in accordance with the aspects described herein.

The computing device 600 may operate in a networked environment using logical connections to remote computing nodes and computer systems through local area network (LAN) 616. The chipset 606 may include functionality for providing network connectivity through a network interface controller (NIC) 622, such as a gigabit Ethernet adapter. A NIC 622 may be capable of connecting the computing device 600 to other computing nodes over a network 616. It should be appreciated that multiple NICs 622 may be present in the computing device 600, connecting the computing device to other types of networks and remote computer systems.

The computing device 600 may be connected to a mass storage device 628 that provides non-volatile storage for the computer. The mass storage device 628 may store system programs, application programs, other program modules, and data, which have been described in greater detail herein. The mass storage device 628 may be connected to the computing device 600 through a storage controller 624 connected to the chipset 606. The mass storage device 628 may consist of one or more physical storage units. A storage controller 624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 600 may store data on a mass storage device 628 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 628 is characterized as primary or secondary storage and the like.

For example, the computing device 600 may store information to the mass storage device 628 by issuing instructions through a storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 may read information from the mass storage device 628 by detecting the physical states or characteristics of one or more particular locations within the physical storage units.

In addition to the mass storage device 628 described herein, the computing device 600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 600.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 628 depicted in FIG. 6, may store an operating system utilized to control the operation of the computing device 600. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 628 may store other system or application programs and data utilized by the computing device 600.

The mass storage device 628 or other computer-readable storage media may also be encoded with computer-executable instructions, which, when loaded into the computing device 600, transforms the computing device from a general-purpose computing system into a special-purpose computer capable of implementing the aspects described herein. These computer-executable instructions transform the computing device 600 by specifying how the CPU(s) 604 transition between states, as described herein. The computing device 600 may have access to computer-readable storage media storing computer-executable instructions, which, when executed by the computing device 600, may perform the methods described in relation to FIGS. 2-5.

A computing device, such as the computing device 600 depicted in FIG. 6, may also include an input/output controller 632 for receiving and processing input from a number of input devices, such as a keyboard, a mouse, a touchpad, a touch screen, an electronic stylus, or other type of input device. Similarly, an input/output controller 632 may provide output to a display, such as a computer monitor, a flat-panel display, a digital projector, a printer, a plotter, or other type of output device. It will be appreciated that the computing device 600 may not include all of the components shown in FIG. 6, may include other components that are not explicitly shown in FIG. 6, or may utilize an architecture completely different than that shown in FIG. 6.

As described herein, a computing device may be a physical computing device, such as the computing device 600 of FIG. 6. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
   receiving, at a device, one or more portions of a voice query;
   determining characteristics of the one or more portions of the voice query;
   comparing each of the characteristics of the one or more portions of the voice query to stored characteristics associated with one or more portions of previously uttered voice queries until the characteristics associated with a combination of the one or more portions of the voice query do not correspond to at least one of the stored characteristics associated with the one or more portions of previously uttered voice queries;
   determining, based on the characteristics associated with the combination of the one or more portions of the voice query not corresponding to at least one of the stored characteristics associated with the one or more portions of previously uttered voice queries, that the one or more portions of the voice query are not capable of being processed at a cache associated with the device; and
   sending, based on the determining that the one or more portions of the voice query are not capable of being processed at the cache associated with the device, the one or more portions of the voice query for processing.

2. The method of claim 1, wherein the voice query comprises a plurality of utterances, and wherein a first portion of the one or more portions of the voice query corresponds to a first subset of the plurality of utterances and a second portion of the one or more portions of the voice query corresponds to a second subset of the plurality of utterances that encompasses the first subset.

3. The method of claim 1, wherein determining that the one or more portions of the voice query are not capable of being processed at the cache associated with the device comprises determining, prior to receiving another one or more portions of the voice query, that the one or more portions of the voice query are not capable of being processed at the cache associated with the device.

4. The method of claim 1, wherein each of the one or more portions of the voice query is associated with a different time interval of the voice query.

5. The method of claim 1, wherein:
   determining the characteristics of the one or more portions of the voice query comprises generating audio fingerprints based on the one or more portions of the voice query, and wherein:
   comparing each of the characteristics of the one or more portions of the voice query to stored characteristics associated with the one or more portions of previously uttered voice queries comprises comparing each of the audio fingerprints to one or more stored audio fingerprints associated with the one or more portions of the previously uttered voice queries.

6. The method of claim 1, wherein each of the characteristics comprises one or more of an audio fingerprint, a spectrogram, an energy signature, or an acoustic feature.

7. The method of claim 1, wherein the determination that the one or more portions of the voice query are not capable of being processed at the cache associated with the device is determined before all portions of the voice query are received.

8. A non-transitory computer-readable medium storing instructions that, when executed, cause:
   receiving, at a device, one or more portions of a voice query;
   determining characteristics of the one or more portions of the voice query;
   comparing each of the characteristics of the one or more portions of the voice query to stored characteristics associated with one or more portions of previously uttered voice queries until the characteristics associated with a combination of the one or more portions of the voice query do not correspond to at least one of the stored characteristics associated with the one or more portions of previously uttered voice queries;
   determining, based on the characteristics associated with the combination of the one or more portions of the voice query not corresponding to at least one of the stored characteristics associated with the one or more portions of previously uttered voice queries, that the one or more portions of the voice query are not capable of being processed at a cache associated with the device; and
   sending, based on the determining that the one or more portions of the voice query are not capable of being processed at the cache associated with the device, the one or more portions of the voice query for processing.

9. The non-transitory computer readable medium of claim 8, wherein the voice query comprises a plurality of utterances, and wherein a first portion of the one or more portions of the voice query corresponds to a first subset of the plurality of utterances and a second portion of the one or more portions of the voice query corresponds to a second subset of the plurality of utterances that encompasses the first subset.

10. The non-transitory computer readable medium of claim 8, wherein the instructions that cause determining that the one or more portions of the voice query are not capable of being processed at the cache associated with the device cause determining, prior to receiving another one or more portions of the voice query, that the one or more portions of the voice query are not capable of being processed at the cache associated with the device.

11. The non-transitory computer readable medium of claim 8, wherein each of the one or more portions of the voice query is associated with a different time interval of the voice query.

12. The non-transitory computer readable medium of claim 8, wherein the instructions that cause:
   determining the characteristics of the one or more portions of the voice query cause generating audio fingerprints based on the one or more portions of the voice query, and wherein the instructions that cause:
   comparing each of the characteristics of the one or more portions of the voice query to stored characteristics associated with the one or more portions of previously uttered voice queries cause comparing each of the audio fingerprints to one or more stored audio fingerprints associated with the one or more portions of the previously uttered voice queries.

13. The non-transitory computer readable medium of claim 12, wherein each of the characteristics comprises one or more of an audio fingerprint, a spectrogram, an energy signature, or an acoustic feature.

14. The non-transitory computer readable medium of claim 8, wherein the determination that the one or more portions of the voice query are not capable of being processed at the cache associated with the device is determined before all portions of the voice query are received.

15. A device comprising:
   one or more processors; and
   memory storing instructions that, when executed by the one or more processors, cause the device to:
   receive one or more portions of a voice query;
   determine characteristics of the one or more portions of the voice query;
   compare each of the characteristics of the one or more portions of the voice query to stored characteristics associated with one or more portions of previously uttered voice queries until the characteristics associated with a combination of the one or more portions of the voice query do not correspond to at least one of the stored characteristics associated with the one or more portions of previously uttered voice queries;
   determine, based on the characteristics associated with the combination of the one or more portions of the voice query not corresponding to at least one of the stored characteristics associated with the one or more portions of previously uttered voice queries, that the one or more portions of the voice query are not capable of being processed at a cache associated with the device; and
   send, based on the determining that the one or more portions of the voice query are not capable of being processed at the cache associated with the device, the one or more portions of the voice query for processing.

16. The device of claim 15, wherein the voice query comprises a plurality of utterances, and wherein a first portion of the one or more portions of the voice query corresponds to a first subset of the plurality of utterances and a second portion of the one or more portions of the voice query corresponds to a second subset of the plurality of utterances that encompasses the first subset.

17. The device of claim 15, wherein the instructions that, when executed by the one or more processors, cause the device to determine that the one or more portions of the voice query are not capable of being processed at the cache associated with the device, cause the device to determine, prior to receiving another one or more portions of the voice query, that the one or more portions of the voice query are not capable of being processed at the cache associated with the device.

18. The device of claim 15, wherein each of the one or more portions of the voice query is associated with a different time interval of the voice query.

19. The device of claim 15, wherein the instructions that, when executed by the one or more processors, cause the device to:
   determine the characteristics of the one or more portions of the voice query, cause the device to generate audio fingerprints based on the one or more portions of the voice query, and wherein the instructions that, when executed by the one or more processors, cause the device to:
   compare each of the characteristics of the one or more portions of the voice query to stored characteristics associated with the one or more portions of previously uttered voice queries, cause the device to compare each of the audio fingerprints to one or more stored audio fingerprints associated with the one or more portions of the previously uttered voice queries.

20. The device of claim 15, wherein the determination that the one or more portions of the voice query are not capable of being processed at the cache associated with the device is determined before all portions of the voice query are received.

* * * * *